(12) United States Patent
Easley (10) Patent No.: US 10,883,246 B2
(45) Date of Patent: Jan. 5, 2021

(54) DEPTH GAUGE TOOL AND GRADER BLADE ASSEMBLY

(71) Applicant: Danny Ray Easley, Paris, KY (US)

(72) Inventor: Danny Ray Easley, Paris, KY (US)

( * ) Notice: Subject to any disclaimer, the term of this patent is extended or adjusted under 35 U.S.C. 154(b) by 0 days.

(21) Appl. No.: 16/142,433

(22) Filed: Sep. 26, 2018

(65) Prior Publication Data

US 2019/0093312 A1  Mar. 28, 2019

Related U.S. Application Data

(60) Provisional application No. 62/563,903, filed on Sep. 27, 2017.

(51) Int. Cl.
*E02F 3/76* (2006.01)
*A01K 1/00* (2006.01)

(52) U.S. Cl.
CPC .......... *E02F 3/7627* (2013.01); *A01K 1/0094* (2013.01)

(58) Field of Classification Search
CPC .............................. E02F 3/7627; E02F 3/652
USPC ............................................ 172/727; 56/6, 7
See application file for complete search history.

(56) References Cited

U.S. PATENT DOCUMENTS

| | | | | |
|---|---|---|---|---|
| 199,636 A * | 1/1878 | Gale | | A01B 23/046 |
| | | | | 172/396 |
| 354,086 A * | 12/1886 | Ball | | A01B 23/046 |
| | | | | 172/396 |
| 1,392,161 A * | 9/1921 | Hilts | | E01C 19/29 |
| | | | | 404/89 |
| 1,398,326 A * | 11/1921 | Johnson | | E02F 5/027 |
| | | | | 172/799.5 |
| 1,500,367 A * | 7/1924 | Caughey | | A01B 7/00 |
| | | | | 172/574 |
| 1,531,278 A * | 3/1925 | Flatley | | A01B 21/08 |
| | | | | 172/323 |
| 1,773,254 A * | 8/1930 | Becker | | E02F 3/8157 |
| | | | | 172/783 |
| 2,342,030 A * | 2/1944 | Bagan | | A01B 33/103 |
| | | | | 172/119 |
| 2,842,040 A | 9/1949 | Thorns et al. | | |
| 2,557,443 A * | 6/1951 | Leonard | | A01B 59/065 |
| | | | | 172/418 |
| 2,670,668 A * | 3/1954 | Konig | | A01B 33/04 |
| | | | | 172/43 |
| 3,095,933 A * | 7/1963 | Bunting | | A01B 63/1145 |
| | | | | 172/491 |
| 3,456,607 A * | 7/1969 | West | | A01B 19/00 |
| | | | | 111/149 |
| 3,684,029 A | 8/1972 | Clover et al. | | |
| 3,783,950 A * | 1/1974 | Geurts | | A01B 59/00 |
| | | | | 172/285 |
| 3,970,012 A | 7/1976 | Jones, Sr. | | |
| 4,215,495 A | 8/1980 | Wagner | | |
| 4,423,788 A | 1/1984 | Robinson, Jr. et al. | | |
| 5,611,292 A * | 3/1997 | Clark | | A01C 5/068 |
| | | | | 111/189 |

(Continued)

*Primary Examiner* — Tara Mayo-Pinnock
(74) *Attorney, Agent, or Firm* — King & Schickli, PLLC (57) ABSTRACT

A depth gauge tool for a grader blade includes a first mounting bracket, a first depth wheel assembly carried on the first mounting bracket, a second mounting bracket and a second depth wheel assembly carried on the second mounting bracket. Each depth wheel assembly includes a plurality of radially arrayed fingers. A grader blade assembly and a method of grading are also provided.

14 Claims, 7 Drawing Sheets

(56) References Cited

U.S. PATENT DOCUMENTS

| | | | | |
|---|---|---|---|---|
| 5,957,219 A | * | 9/1999 | Friggstad | A01C 7/203 |
| | | | | 111/194 |
| 6,325,156 B1 | * | 12/2001 | Barry | A01B 15/18 |
| | | | | 172/518 |
| 6,644,223 B2 | * | 11/2003 | Prairie et al. | A01B 71/02 |
| | | | | 111/137 |
| 7,686,537 B2 | | 3/2010 | Mullett | |
| 7,757,777 B1 | * | 7/2010 | Wipf et al. | A01C 5/066 |
| | | | | 111/192 |
| 9,408,339 B2 | | 8/2016 | Jensen et al. | |

* cited by examiner

DEPTH GAUGE TOOL AND GRADER BLADE ASSEMBLY

This application claims the benefit of U.S. provisional patent application Ser. No. 62/563,903, filed on 27 Sep. 2017, the full disclosure of which is incorporated herein by reference.

TECHNICAL FIELD

This document relates generally to the field of earth moving equipment and, more particularly, to a new and improved depth gauge tool, grader blade assembly and method of grading a cover material layer on a substrate layer.

BACKGROUND

Equestrian footing can be of multiple materials, with the most common surfaces from the sand family. There are various types of sand, all having different characteristics. The sand is typically 1-3 inches in depth, on a Class 1 sand (fine ground limestone) base. A correctly formed base must be level, and can be on a flat or sloped plane, and will have the consistency of concrete. Sand is then uniformly graded over the Class 1 sand (C1S) for the footing to create a resilient surface. It is most important for the footing to be of a consistent depth.

Both the C1S and footing are graded, using laser equipment for accuracy. Typically, when the base and footing are constructed in a new arena, a commercial excavator uses laser equipment for precision. From a maintenance viewpoint, on a base that is not a true plane, laser equipment is not accurate, since laser works off the top of a surface.

Over time, the sand gets displaced due to horse traffic, weather and drag equipment. Proper maintenance requires the arena to be periodically re-graded. A commonality among arena and farm owners is some type of grading equipment such as a grader or box blade. This document relates to a new and improved rolling depth gauge designed to be mounted (bolted or welded) on both outside ends of such grading equipment to achieve a uniform depth.

The new and improved rolling depth gauge and a grader blade assembly equipped with that rolling depth gauge work off the bottom, or base up resulting in a cover material layer of consistent depth. The adjustable, 0-6 inch rolling wheel assemblies can be set at a desired gap distance between the base layer and the top of the footing layer. This setting will also agree with the grader blade.

SUMMARY

In accordance with the purposes and benefits described herein, a new and improved depth gauge tool is provided. That depth gauge tool comprises a first mounting bracket and a first depth wheel assembly carried on the first mounting bracket.

The first depth wheel assembly includes a first plurality of radially arrayed fingers. The first depth wheel assembly also includes a first stub shaft and a first hub carried on the first stub shaft. The first plurality of radially arrayed fingers project from the first hub.

The first mounting bracket may include a first adjustment track. The first depth wheel assembly may include a first clamping element engaging the first mounting bracket and adjustable along the first adjustment track. Further, the first depth wheel assembly may include a first fastener securing the first clamping element to the first mounting bracket at a selected height position along the first adjustment track.

The depth gauge tool may further include a second mounting bracket and a second depth wheel assembly carried on the second mounting bracket. That second depth wheel assembly may also include a second plurality of radially arrayed fingers.

Still further, the second depth wheel assembly may include a second stub shaft and a second hub carried on the second stub shaft. The second plurality of radially arrayed fingers may project from the second hub.

The second mounting bracket may include a second adjustment track. Further, the second depth wheel assembly may include a second clamping element engaging the second mounting bracket and adjustable along the second adjustment track. Still further, the second depth wheel assembly may include a second fastener securing the first clamping element to the second mounting bracket at a selected height position along the second adjustment track.

In accordance with yet another aspect, a new and improved grader blade assembly is provided. That grader blade assembly comprises: (a) a first end plate, (b) a second end plate, (c) a grader blade extending between the first and second end plates and (d) a depth gauge tool. That depth gauge tool includes a first depth wheel assembly carried on a first mounting bracket on the first end plate and a second depth wheel assembly carried on a second mounting bracket on the second end plate.

In accordance with still another aspect, a new and improved method is provided for grading a cover material layer on a substrate layer. That method comprises the steps of: (a) adjusting a height of a first depth wheel assembly and a second depth wheel assembly of a depth gauge tool carried on a grader blade assembly and (b) supporting the grader blade assembly at a desired grading height on the first depth wheel assembly and the second depth wheel assembly.

Still further, the method may include the step of providing the first depth wheel assembly with a first plurality of radially arrayed fingers and the second depth wheel assembly with a second plurality of radially arrayed fingers.

The method may also include the steps of: (a) penetrating the cover material layer with the first and second plurality of radially arrayed fingers and (b) rolling the first and second plurality of radially arrayed fingers along an upper surface of the substrate layer to thereby provide the cover material layer at a consistent depth over the upper surface of the substrate layer.

In the following description, there are shown and described several preferred embodiments of the depth gauge tool, grader blade assembly and related method of grading a cover material layer over a substrate layer. As it should be realized, the depth gauge tool, grader blade assembly and related method are capable of other, different embodiments and their several details are capable of modification in various, obvious aspects all without departing from the depth gauge tool, grader blade assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the depth gauge tool, grader blade assembly and related method and together with the description serve to explain certain principles thereof.

DETAILED DESCRIPTION

As illustrated in FIGS. 1A, 1B, 1C, 2A, 2B and 3, a grader blade assembly 10 includes a first end plate 12, a second end plate 14, a grader blade 16 extending between the first and second end plates and a new and improved rolling depth gauge, generally designated by reference number 18. As will be explained in greater detail below, the rolling depth gauge 18 is height adjustable to support the grader blade at a desired grading height over a support substrate.

Figure 1A:
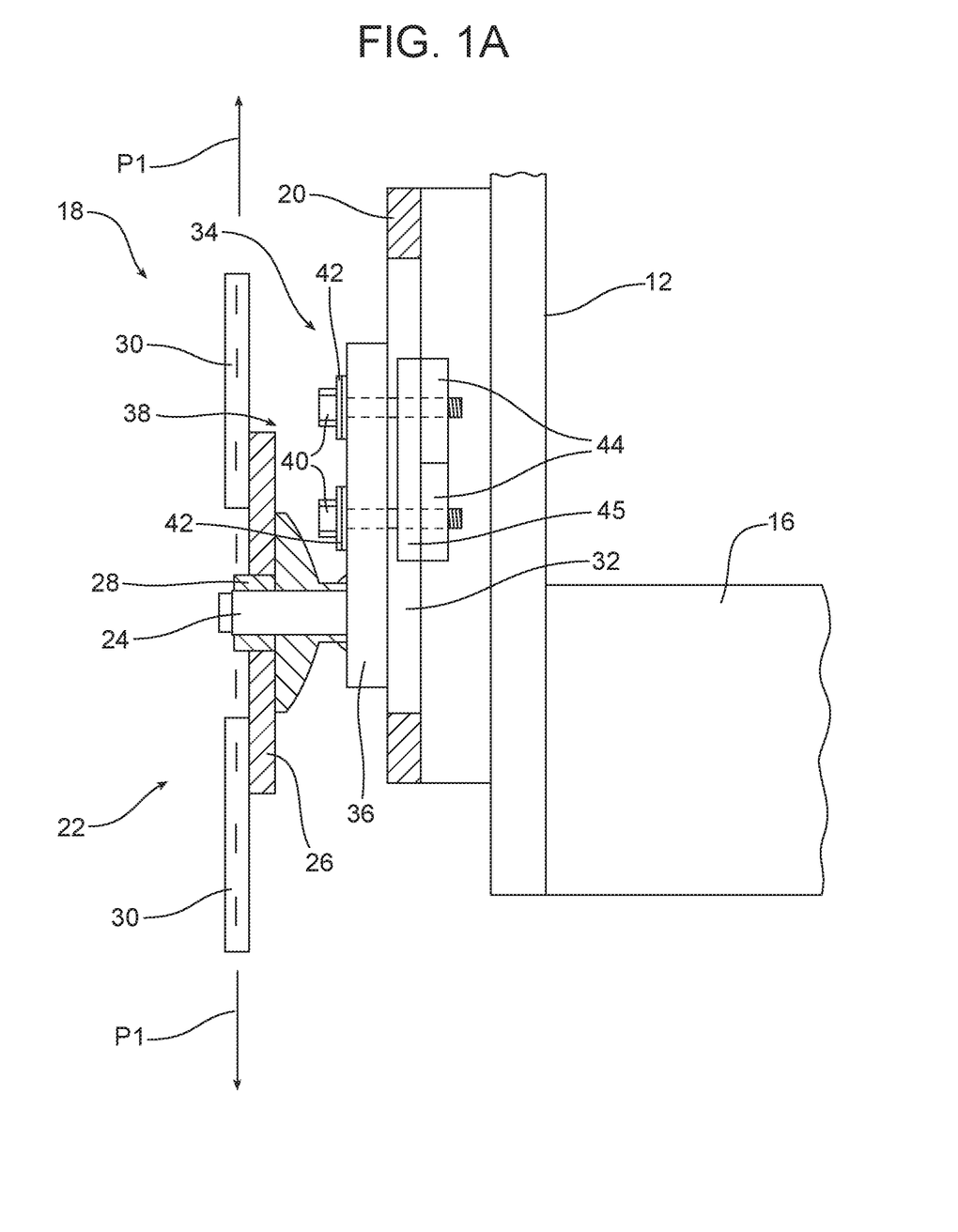
FIG. 1A is a detailed schematic elevational view of the first mounting bracket and first depth wheel assembly of the new and improved rolling depth gauge.

The rolling depth gauge 18 includes a first mounting bracket 20 and a first depth wheel assembly 22. The first mounting bracket 20 is fixed by welding or other means to the outer face of the first end plate 12. The first depth wheel assembly 22 is carried on the first mounting bracket 20.

Figure 1B:
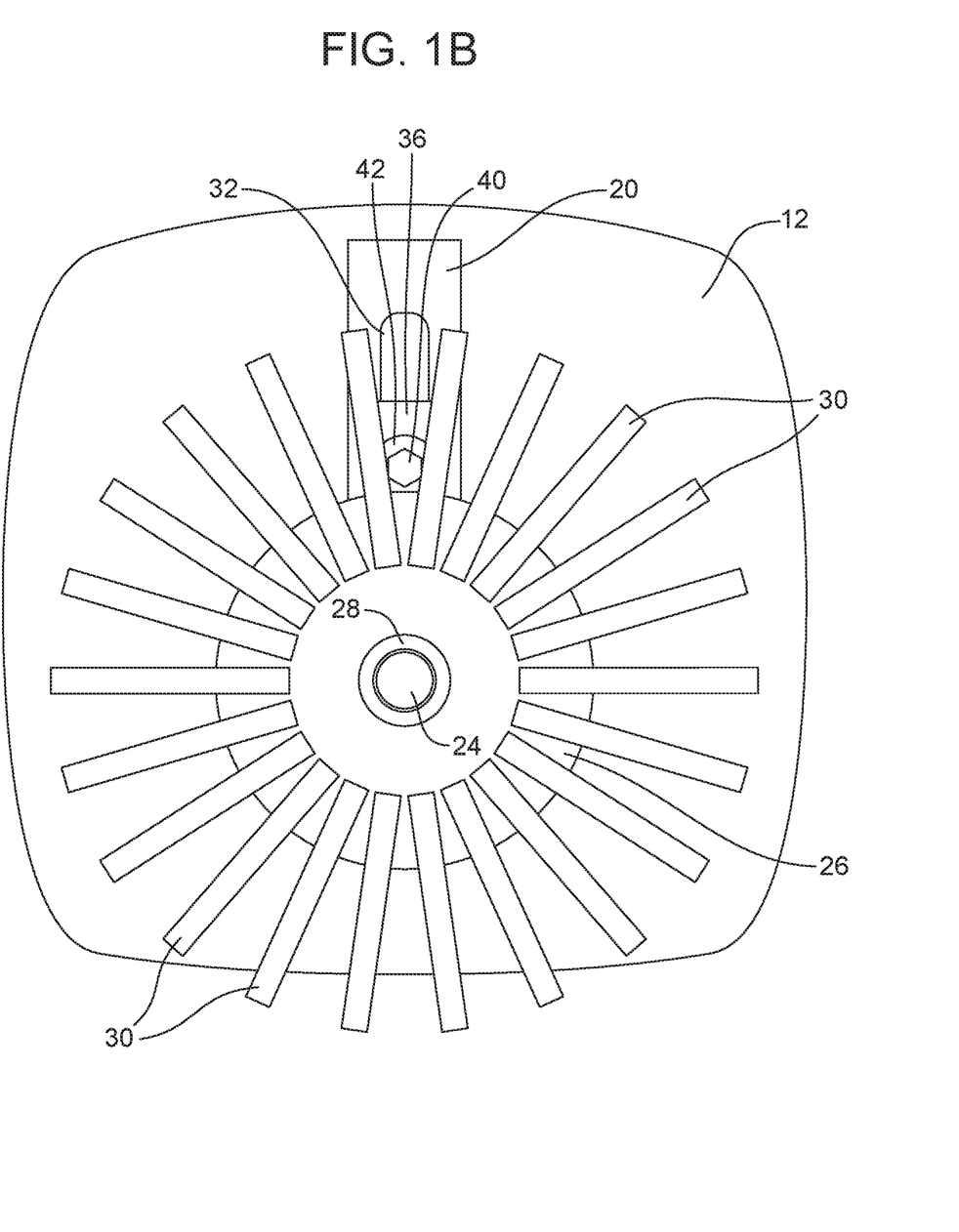
FIG. 1B is a side elevational view of the first depth wheel assembly illustrated in FIG. 1A.

As best illustrated in FIGS. 1A and 1B, the first depth wheel assembly 22 includes a first stub shaft 24 and a first hub 26 carried on the first stub shaft. A first bearing 28 is provided between the first stub shaft 24 and the first hub 26 to allow the first hub to rotate freely on the first stub shaft. A first plurality of radially arrayed fingers 30 project from the first hub 26. The first plurality of radially arrayed fingers 30 may each have a diameter of about 1.9 cm and may be spaced apart center-to-center at the free ends thereof by about 6.35 cm. The tip-to-tip diameter of opposed fingers may be 45.7 cm. The first plurality of radially arrayed fingers 30 are all aligned within a single plane P1. In the illustrated embodiment, a total of twenty-two fingers 30 are carried on the first hub 26.

The first mounting bracket 20 includes a first adjustment track 32 in the form of an elongated slot. The first depth wheel assembly 22 includes a first clamping element 34 that engages the first mounting bracket 20 and is adjustable along the first adjustment track 32. The first clamping element 34 secures the first depth wheel assembly 22 to the first mounting bracket 20 at a selected height position along the first adjustment track 32.

Figure 1C:
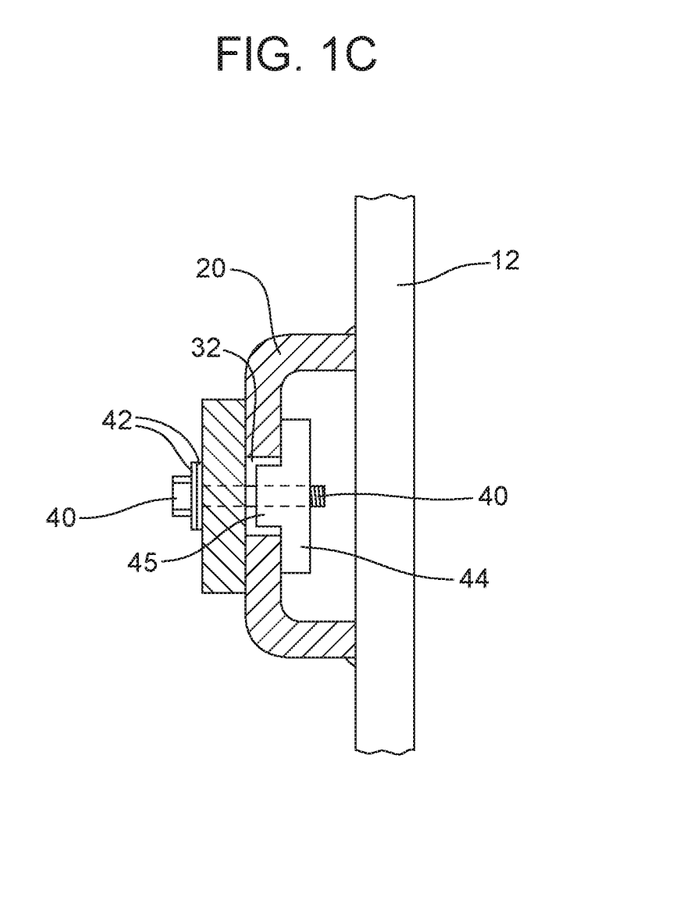
FIG. 1C is a detailed, partially cross sectional illustration of the first mounting bracket, including the first adjustment track, and the slide bolt including a rib projecting into the first adjustment track.

As best illustrated in FIGS. 1A and 1C, the first clamping element 34 includes a first support plate 36 and a first fastener 38. The proximal end of the first stub shaft 24 is fixed to the first support plate 36. The first fastener 38 includes two bolts 40, two or more washers 42 and two slide nuts 44. The two bolts 40 extend through the first adjustment track 32 (note the slot) and are tightened in the two slide nuts 44 to: (a) squeeze the first support plate 36 and the first mounting bracket 20 together between the washers 42 on one side and the slide nuts 44 on the opposite side and (b) thereby hold the first depth wheel assembly 22 in the desired/selected height position. Note, each slide nut 44 includes a shoulder or rib 45 that projects into the first adjustment track 32. See detail illustrated in FIG. 1C.

The rolling depth gauge 18 also includes a second mounting bracket 48 and a second depth wheel assembly 50. The second mounting bracket 48 is fixed by welding or other means to the outer face of the second end plate 14. See FIGS. 2A and 3. The second depth wheel assembly 50 is carried on the second mounting bracket 48.

Figure 2A:
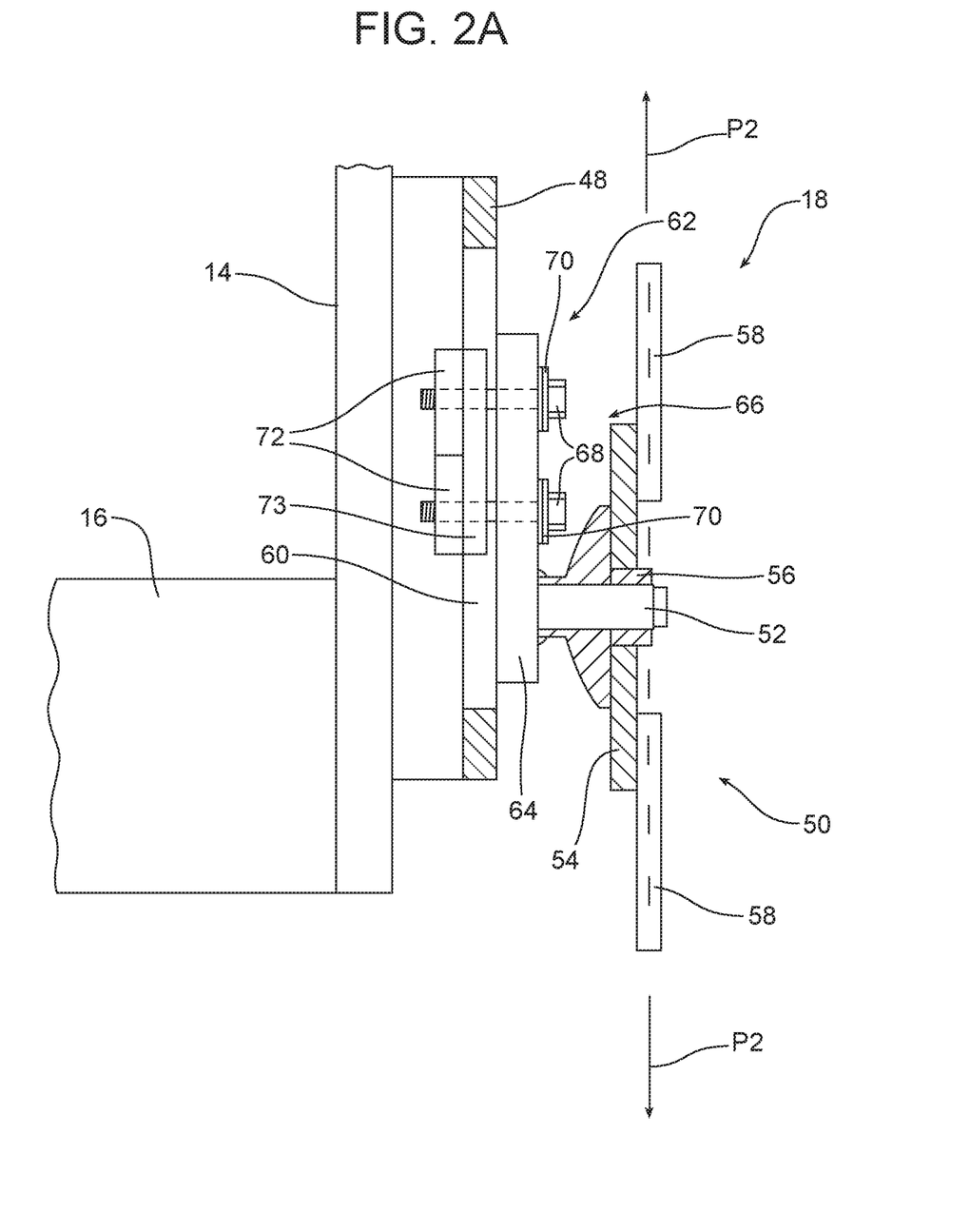
FIG. 2A is a detailed schematic elevational view of the second mounting bracket and second depth wheel assembly of the new and improved rolling depth gauge.
Figure 2B:
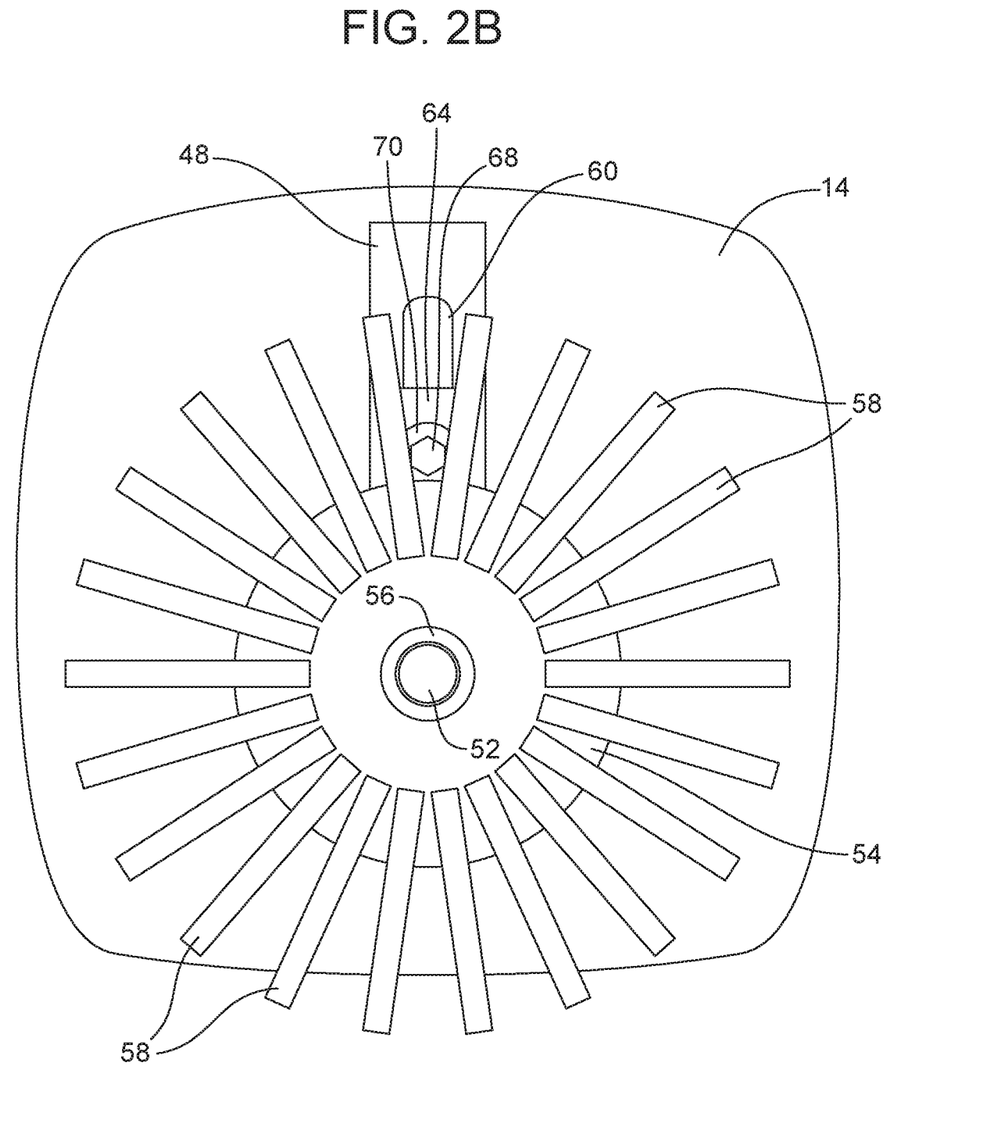
FIG. 2B is a side elevational view of the second depth wheel assembly illustrated in FIG. 2A.

As best illustrated in FIGS. 2A and 2B, the second depth wheel assembly 50 includes a second stub shaft 52 and a second hub 54 carried on the second stub shaft. A second bearing 56 is provided between the second stub shaft 52 and the second hub 54 to allow the second hub to rotate freely on the second stub shaft. A second plurality of radially arrayed fingers 58 project from the second hub 54. The second plurality of radially arrayed fingers 58 may be sized, shaped and configured to be identical to the first plurality of radially arrayed fingers 30. The second plurality of radially arrayed fingers 58 are all aligned within a single plane P2 parallel to the single plane P1.

The second mounting bracket 48 includes a second adjustment track 60 also in the form of an elongated slot. The second depth wheel assembly 50 includes a second clamping element 62 that engages the second mounting bracket 48 and is adjustable along the second adjustment track 60. The second clamping element 62 secures the second depth wheel assembly 50 to the second mounting bracket 48 at a selected height position along the second adjustment track 60.

In the illustrated embodiment, the second clamping element 62 includes a second support plate 64 and a second fastener 66. The proximal end of the second stub shaft 52 is fixed to the second support plate 64. The second fastener 66 includes two bolts 68, two or more washers 70 and two slide nuts 72. The two bolts 68 extend through the second adjustment track 60 (note the slot) and are tightened in the two slide nuts 72 to: (a) squeeze the second support plate 64 and the second mounting bracket 48 together between the washers 70 on one side and the slide nuts 72 on the opposite side and (b) thereby hold the second depth wheel assembly 50 in the desired/selected height position. As shown, each slide nut 72 includes a shoulder or rib 73 that projects into the second adjustment track 60.

Figure 3:
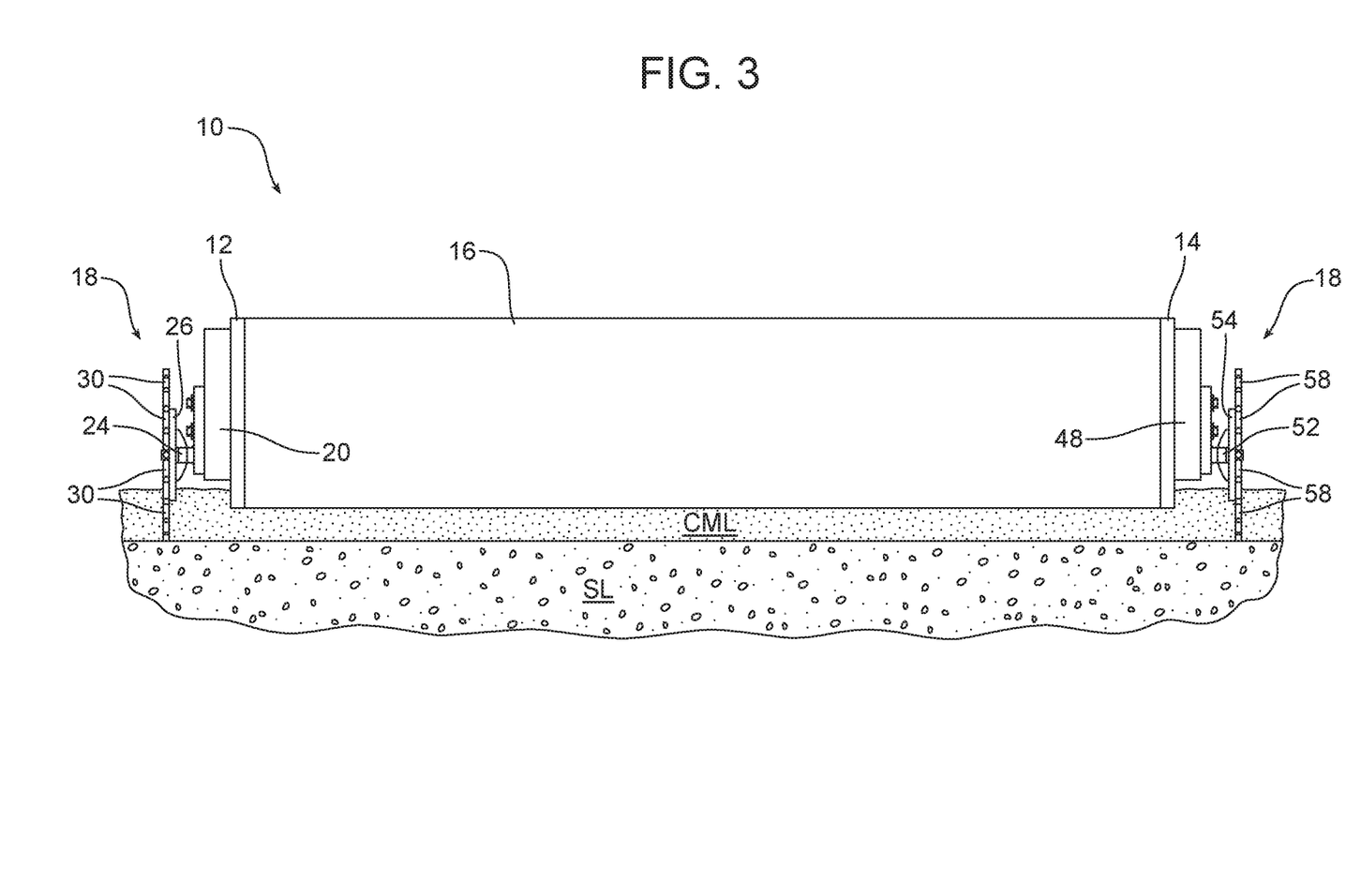
FIG. 3 is a schematic illustration of how a grader blade assembly, incorporating the rolling depth gauge of FIGS. 1A, 1B, 2A and 2B is used to grade a cover layer on a substrate layer.

The grader blade assembly 10 illustrated in FIG. 3 is useful in a method of grading a cover material layer on a substrate layer. In one possible application, the grader blade assembly 10 is used to grade an equestrian riding arena surface consisting of a cover material layer of sand typically graded to be a consistent 2.54-7.62 cm deep on top of a substrate layer or base of Class 1 sand (fine ground limestone).

The method may include the steps of: (a) adjusting the height of the first depth wheel assembly 22 and the second depth wheel assembly 50 of the rolling depth gauge 18 carried on the respective first and second end plates 12, 14 of the grader blade assembly 10 and (b) supporting the grader blade assembly at a desired grading height on the first depth wheel assembly and the second depth wheel assembly.

The method may also include the step of providing the first depth wheel assembly 22 with a first plurality of radially arrayed fingers 30 and the second depth wheel assembly 50 with a second plurality of radially arrayed fingers 58. Further, as illustrated in FIG. 3, the method may include the steps of penetrating the cover layer material CLM with the first and second plurality of radially arrayed fingers 30, 58 and rolling the first and second plurality of radially arrayed fingers along an upper surface US of the substrate layer SL to thereby provide the cover material layer at a consistent depth over the upper surface of the substrate layer. Thus, it should be appreciated that the grader blade assembly 10 is supported on the first plurality of radially arrayed fingers 30 and second plurality of radially arrayed fingers 58. To achieve this end, the radially arrayed fingers 30, 58 each have a footprint of cross sectional area that allows penetration of the cover layer material CLM but is sufficient to support the weight of the grader blade assembly 10 on the upper surface US of the relatively dense substrate layer SL underlying the cover layer material CLM.

Figure 4:
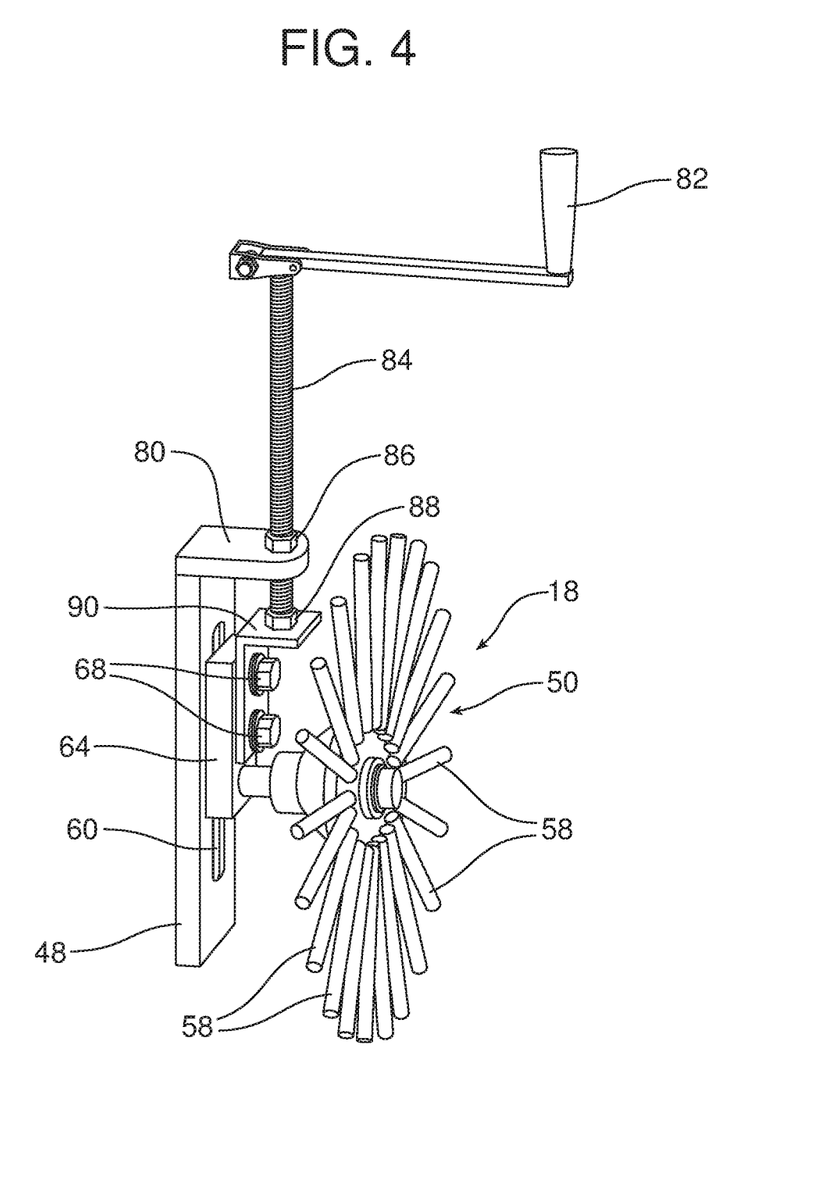
FIG. 4 is a perspective view of one end of a grader blade assembly including a rolling depth gauge having a crank stand and a crank handle to allow for simple height adjustment in a quick and efficient manner.

In an alternative embodiment illustrated in FIG. 4, the second mounting bracket 48 includes an integral crank stand 80. A crank handle 82 includes a threaded section 84 that engages with nut 86 welded to the crank stand 80. The distal end 88 of the crank handle 82 is bolted to the support plate 64 at the lug 90. One is able to simply turn the crank handle 82 (a) in a first direction to raise the rolling depth gauge 18 with respect to the grader blade 16 and (b) in a second direction to lower the rolling depth gauge with respect to the grader blade. Toward this end, it should be appreciated that the bolts 68 have been loosened slightly to release clamping pressure and allow relative sliding movement between the support plate 64 carrying the second depth wheel assembly 50 and the bracket 48. While not shown, it should be appreciated that a similar crank stand arrangement would be provided at the opposite end of the grader blade 16 for adjusting the height of the first depth wheel assembly 22.

In summary, numerous benefits result from the new and improved rolling depth gauge 18 and the grader blade assembly 10 equipped with that rolling depth gauge. As should be appreciated, the grader blade assembly 10 is supported on the two depth wheel assemblies 22, 50. More specifically the first plurality of radially arrayed fingers 30 and the second plurality of radially arrayed fingers 58 provide a rolling footprint adapted to penetrate the cover layer material CLM yet roll over the surface of the more dense, harder substrate layer SL under the weight of the grader blade assembly 10. This makes it possible to provide the cover layer material CLM at a consistent and desired depth over the substrate layer SL.

The foregoing has been presented for purposes of illustration and description. It is not intended to be exhaustive or to limit the embodiments to the precise form disclosed. Obvious modifications and variations are possible in light of the above teachings. For example, the two slide nuts 44 could be replaced by a single slide block configured to receive both bolts 40. All such modifications and variations are within the scope of the appended claims when interpreted in accordance with the breadth to which they are fairly, legally and equitably entitled.

What is claimed:

1. A grader blade assembly used to grade a cover layer material over a substrate layer, comprising:
   a first end plate;
   a second end plate;
   a grader blade extending between said first end plate and said second end plate; and
   a depth gauge tool including a first depth wheel assembly, having a first plurality of radially arrayed fingers, carried on a first mounting bracket on said first end plate and a second depth wheel assembly, having a second plurality of radially arrayed fingers, carried on a second mounting bracket on said second end plate wherein the first and second plurality of radially arrayed fingers have a footprint of cross-sectional area (a) adapted to allow penetration of the cover layer material but (b) sufficient to support the weight of the grader blade assembly on the substrate layer underlying the cover layer material.

2. The grader blade assembly of claim 1, wherein said first depth wheel assembly includes a first stub shaft and a first hub carried on said first stub shaft.

3. The grader blade assembly of claim 2, wherein said first plurality of radially arrayed fingers project from said first hub.

4. The grader blade assembly of claim 3, wherein said first mounting bracket includes a first adjustment track.

5. The grader blade assembly of claim 4, wherein said first depth wheel assembly includes a first clamping element engaging said first mounting bracket and adjustable along said first adjustment track.

6. The grader blade assembly of claim 5, wherein said first depth wheel assembly includes a first fastener securing said first clamping element to said first mounting bracket at a selected height position along said first adjustment track.

7. The grader blade assembly of claim 6, wherein said second depth wheel assembly includes a second plurality of radially arrayed fingers.

8. The grader blade assembly of claim 7, wherein said second depth wheel assembly includes a second stub shaft and a second hub carried on said second stub shaft.

9. The grader blade assembly of claim 8, wherein said second plurality of radially arrayed fingers project from said second hub.

10. The grader blade assembly of claim 9, wherein said second mounting bracket includes a second adjustment track.

11. The grader blade assembly of claim 10, wherein said second depth wheel assembly includes a second clamping element engaging said second mounting bracket and adjustable along said second adjustment track.

12. The grader blade assembly of claim 11, wherein said second depth wheel assembly includes a second fastener securing said first clamping element to said second mounting bracket at the selected height position along said second adjustment track.

13. A method of grading a cover material layer on a substrate layer, comprising:
   adjusting a height of a first depth wheel assembly and a second depth wheel assembly of a depth gauge tool carried on a grader blade assembly;
   supporting said grader blade assembly at a desired grading height on said first depth wheel assembly and said second depth wheel assembly;
   providing said first depth wheel assembly with a first plurality of radially arrayed fingers and said second depth wheel assembly with a second plurality of radially arrayed fingers; and
   penetrating said cover material layer with said first plurality of radially arrayed fingers and said second plurality of radially arrayed fingers.

14. The method of claim 13, including rolling said first plurality of radially arrayed fingers and said second plurality of radially arrayed fingers along an upper surface of said substrate layer to thereby provide said cover material layer at a consistent depth over said upper surface of said substrate layer.

* * * * *